Figure 1:
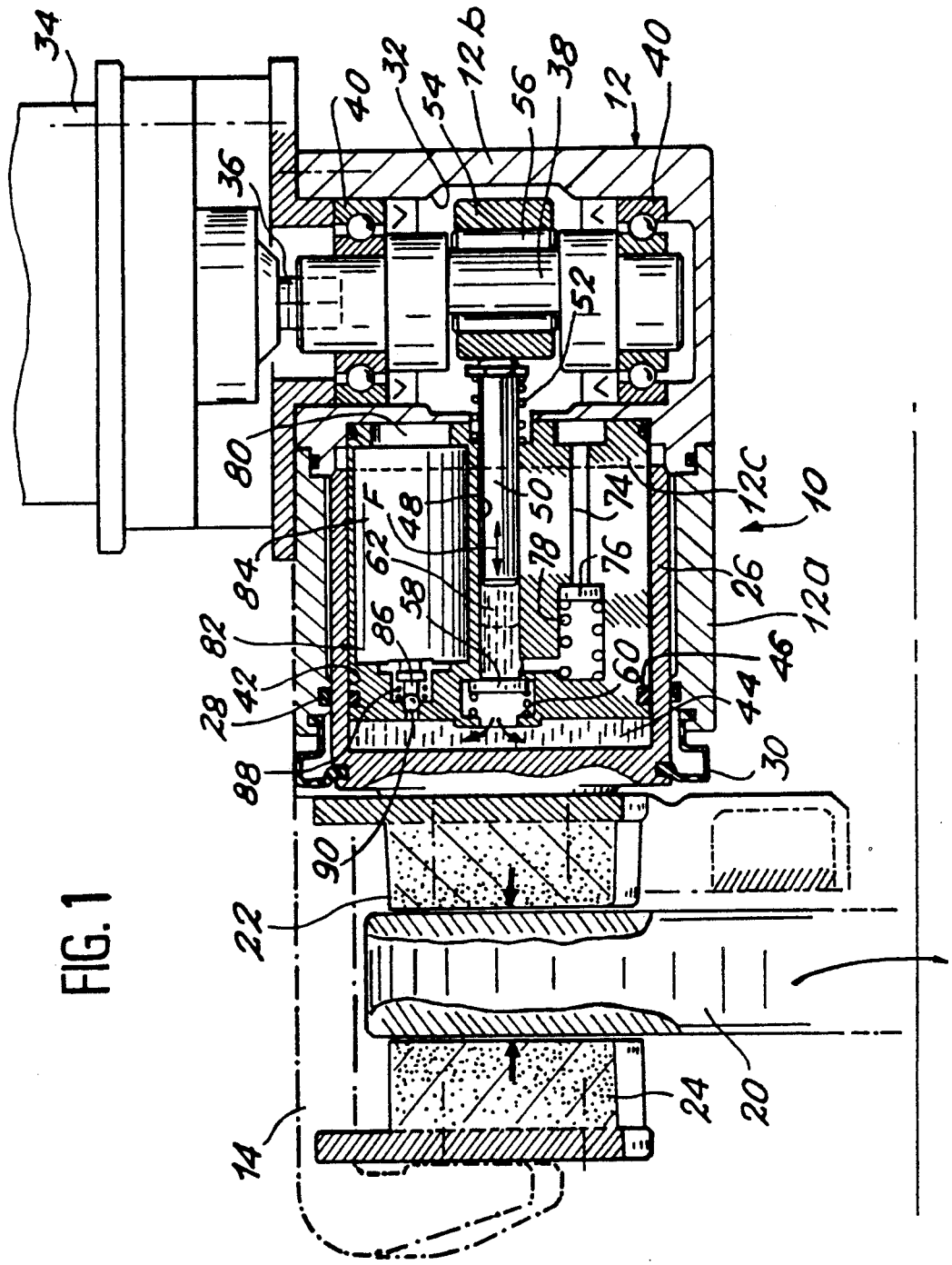

United States Patent [19]

Fargier

[11] Patent Number: 5,000,295
[45] Date of Patent: Mar. 19, 1991

[54] ELECTRICALLY CONTROLLED BRAKE ACTUATOR

[75] Inventor: Eric Fargier, Neuilly-Plaisance, France

[73] Assignee: Bendix France, Drancy, France

[21] Appl. No.: 371,677

[22] Filed: Jun. 22, 1989

Related U.S. Application Data

[63] Continuation of Ser. No. 170,213, Mar. 18, 1988, abandoned.

[30] Foreign Application Priority Data

Mar. 26, 1987 [FR] France .............................. 87 04203

[51] Int. Cl.[5] .............................................. F16D 65/20
[52] U.S. Cl. ................................... 188/72.1; 188/72.4;
188/106 P; 192/83; 303/10
[58] Field of Search ............... 188/72.1, 72.4, 72.5,
188/106 P, 106 R, 158, 162; 192/83; 303/10, 61, 116

[56] References Cited

U.S. PATENT DOCUMENTS

| | | | |
|---|---|---|---|
| 3,804,212 | 4/1974 | Haraikawa | 188/72.4 |
| 4,278,300 | 7/1981 | Bacher | 303/116 X |
| 4,387,934 | 6/1983 | Farr | 303/116 |
| 4,435,021 | 3/1984 | Hoenick | 188/72.4 X |
| 4,462,642 | 7/1984 | Leiber | 303/116 X |
| 4,556,260 | 12/1985 | Maehara | 303/116 |

FOREIGN PATENT DOCUMENTS

| | | | |
|---|---|---|---|
| 43351 | 2/1987 | Japan | 303/116 |
| 1359487 | 7/1974 | United Kingdom | 303/116 |

*Primary Examiner*—George E. A. Halvosa
*Attorney, Agent, or Firm*—Larry J. Palguta; Ken C. Decker

[57] ABSTRACT

The actuator (10) of a brake, such as a disc brake, is controlled by an electric motor (34) which drives a pump (38, 50, 62) ensuring that the pressure of the brake fluid in a control chamber (44) rises. A crankshaft (38) driven by the electric motor (34) imparts a to-and-fro movement to a plunger piston (50) in a pumping chamber (62). This chamber (62) communicates with a brake-fluid reservoir via an intake duct (74) controlled by way of a valve (76, 78) and with the chamber (44) via a delivery duct controlled by way of a valve (58, 60). Furthermore, the control chamber (44) communicates with the reservoir via a recycling duct (80) controlled by way of a solenoid valve (82). The entire hydraulic circuit so formed is accommodated in the body (12) of the actuator.

3 Claims, 2 Drawing Sheets

ELECTRICALLY CONTROLLED BRAKE ACTUATOR

This is a continuation of abandoned application Ser. No. 170,213 filed Mar. 18, 1988.

DESCRIPTION

The invention relates to an electrically controlled hydraulic brake actuator, especially for a disc brake, this actuator being designed to be used in the braking system of a vehicle.

The document FR-A-2,210,532 describes a vehicle braking system, in which the rise in pressure of the brake actuators is controlled by a pump driven by means of an electric motor. The supply voltage to this motor depends on the position occupied by the brake pedal. The effect of actuating the pump is to transfer brake fluid from a brake-fluid reservoir to the brake actuators.

Such a braking system is particularly useful when the vehicle is equipped with means for detecting the slipping of one or more of the wheels on the ground during the braking operation. In fact, as the document FR-A-2,210,532 describes, the supply voltage of the electric motor driving the pump can be controlled in order to regulate the braking intensity as a function of the adhesion of the wheels on the ground.

In the system described in the document FR-A-2,210,532, the electric motor, the pump, the reservoir and the actuator are completely separate, and this means that the system has a large overall size. Moreover, the relatively long distance between the pump and the actuator results in an increase in the response times, and this has an adverse effect when the supply voltage of the motor is controlled, during braking, as a function of the relative slipping of the wheels on the ground. This relatively long distance between the various component elements of the hydraulic circuit controlling the actuators also leads to an increase in the length of the piping connecting these elements and consequently in the risk of leakage in this circuit.

The specific subject of the invention is an electrically controlled hydraulic brake actuator having a compact structure embracing both the actual actuator, the various elements of the hydraulic circuit which control it and the electric motor driving the pump of this circuit, so that the response times are very short and the risks of leakage are reduced considerably in relation to the state of the art.

According to the invention, this result is obtained by means of an electrically controlled hydraulic brake actuator comprising a body and a brake piston designed to slide parallel to its axis in the body and delimiting, together with the latter, a main control chamber which communicates via a delivery duct with a pump driven by means of an output shaft of an electric motor, the pump communicating with a brake-fluid reservoir via an intake duct, and a recycling duct connecting the control chamber and the reservoir, characterized in that the reservoir is formed in the body and the electric motor is fastened to the body, the pump comprising a variable-volume pumping chamber formed in the body and partially delimited by one end of a plunger piston which is accommodated in the body and the opposite end of which is connected to the output shaft of the electric motor by means of a mechanism converting a rotation of the shaft into a to-and-fro movement of the plunger piston parallel to the axis, an intake valve and a delivery valve being accommodated respectively in the intake and delivery ducts on the inside of the body.

In a preferred embodiment of the invention, the recycling duct is controlled by means of a solenoid valve accommodated in the body. This characteristic makes it possible, in particular, to mount the actuator according to the invention on a vehicle also equipped with a system making it possible to detect the slipping of one or more of the wheels of a vehicle, this system then supplying control signals which are used to control the solenoid valve.

So that the pressure prevailing in the actuating chamber can then be adjusted according to the position occupied by the brake pedal, a pressure gauge can be located in the control chamber.

In an arrangement which is especially favourable for reducing the overall size of the actuator, the axis of the output shaft of the electric motor is perpendicular to the axis of the plunger piston, the mechanism comprising a crankshaft carried by the shaft and elastic means bearing on the body in order to keep the plunger piston permanently up against the crankshaft.

The body of the actuator preferably has a cylindrical part which projects into a cylindrical recess made in the brake piston in the axis of this piston, the main control chamber being delimited between the end of the cylindrical part of the body and the bottom of the recess, and the plunger piston and the intake and delivery valves being accommodated in the cylindrical part, in which the pumping chamber is also formed.

A second control chamber separated from the main control chamber by sealing means can then be formed between a tubular part of the piston surrounding the recess and a cylinder which belongs to the body and in which the tubular part of the piston slides. This second control chamber can be connected to a hydraulic brake circuit which is completely independent of the circuit controlling the electric motor and which can simultaneously perform the functions of an emergency brake and a parking brake.

Finally, the axes of the plunger piston and of the brake piston preferably merge with one another, thus making it possible to deliver the brake fluid into the control chamber along the axis of the brake piston. This prevents the brake piston from being jammed because the brake fluid arrives offset relative to its axis.

Figure 2:
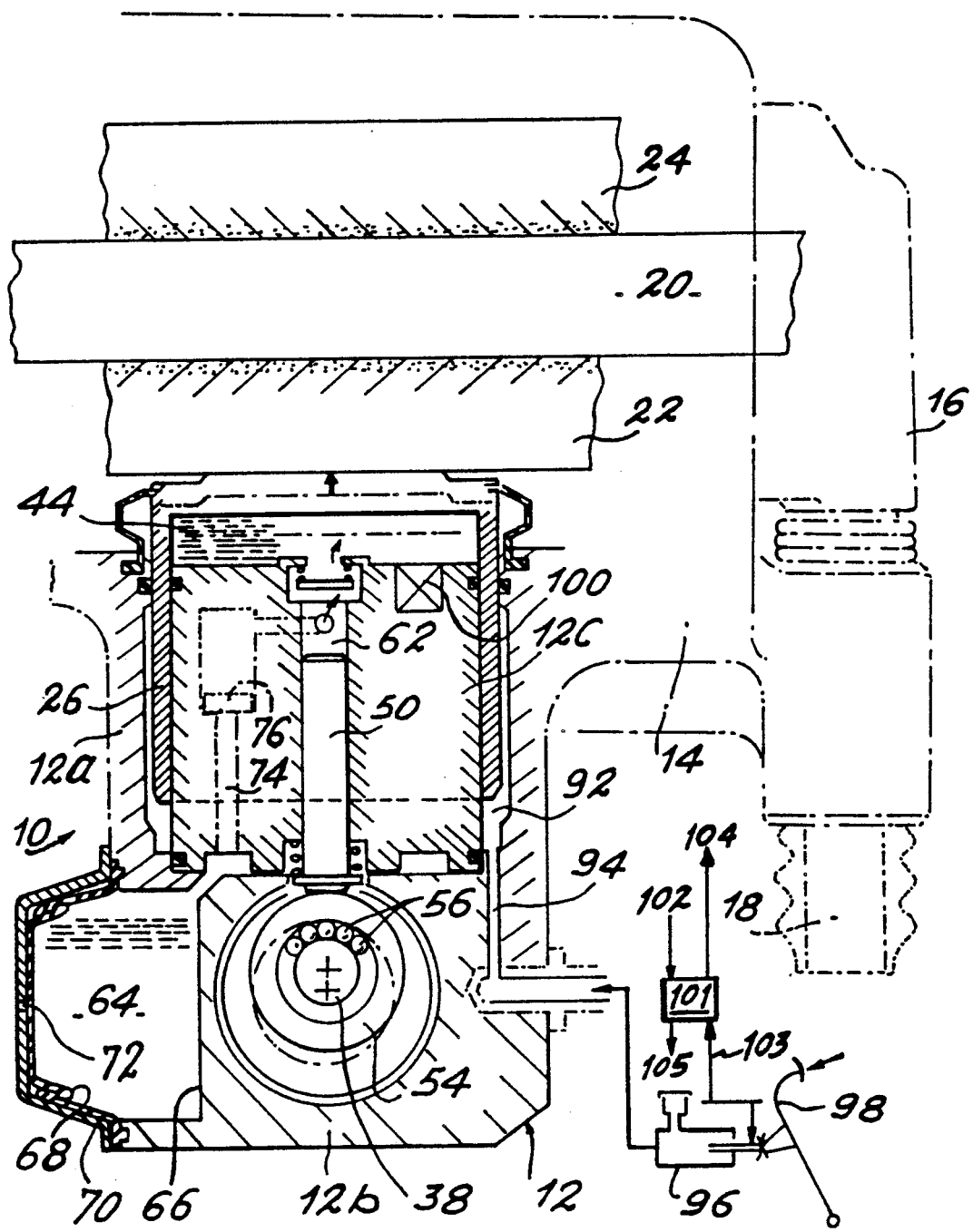

A preferred embodiment of the invention will now be described by way of non-limiting example, with reference to the accompanying drawings in which:

FIG. 1 is a sectional side view showing a disc brake equipped with an actuator according to the invention; and FIG. 2 is a diagrammatic plan view, in partial section, of the disc brake illustrated in FIG. 1.

FIGS. 1 and 2 show a disc brake equipped with an actuator designated as a whole by the reference 10. This actuator comprises a body 12 fixed to a brake caliper 14. The caliper 14 is mounted on a supporting member 16 fastened to a non-rotating part near a wheel of the vehicle, such as a stub axle. More specifically, the caliper 14 is supported slideably by means of at least one column 18 (FIG. 2) which is fastened to the support 16 and which extends parallel to the axis of a brake disc 20 secured to a rotating part, such as a vehicle wheel.

In a known way, the actuator 10 makes it possible to lay a brake block 22 supported slideably by the caliper 14 directly onto a first face of the disc 20 in a direction parallel to the axis of the disc. The caliper 14 also supports a second brake block 24 capable of being laid onto the opposite face of the disc 20, when the actuator 10 is operated, as a result of the sliding of the caliper 14 along the column 18 after the block 22 has been laid against the first face of the disc 20.

Of course, the actuator 10 according to the invention can be used in a brake of a different type, particularly in a disc brake in which each of the blocks is laid against the corresponding face of the disc separately by means of a different actuator.

As illustrated clearly in FIG. 1, the body 12 of the actuator comprises a cylinder 12a, in which a brake piston 26 slides sealingly. The axis common to the cylinder 12a and to the piston 26 is parallel to the axis of the disc 20. Sealing between the cylinder 12a and the outer surface of the piston 26 is ensured by means of an O-ring gasket 28. As for the protection of the part of the piston 26 projecting from the cylinder 12a, this is ensured by means of a deformable bellows seal 30.

The body 12 of the actuator also comprises a rear part 12b fixed sealingly to the cylinder 12a at the end of the latter furthest away from the block 22. This part 12b has a generally cylindrical recess 32 of an axis perpendicular to the axis of the cylinder 12a and of the piston 26. In the exemplary embodiment illustrated, the axis of this recess intersects the axis of the disc 20. The recess 32 is open at one of its ends, to make it possible to fasten and center a direct-current electric motor 34, the output shaft 36 of which enters the recess 32 along the axis of the latter. Inside the recess 32, the output shaft 36 of the electric motor 34 is fixed to a crankshaft 38 supported rotatably in the axis of this recess by means of ball bearings 40.

Finally, the body 12 of the actuator possesses a cylindrical part 12c which projects into a cylindrical recess 42 made in the piston 26 in the axis of the latter and opening out on the opposite side to the brake block 22. This cylindrical part 12c is fastened sealingly to the part 12b of the body of the actuator. A main control chamber 44 is thus delimited between the end of the cylindrical part 12c of the body of the actuator and the bottom of the cylindrical recess 42 made in the piston 26. The sealing of this chamber 44 is maintained by means of an O-ring gasket 46 fitted in an annular groove made near the end of the cylindrical part 12c on the outer surface of the latter. This gasket 46 bears sealingly against the cylindrical inner surface of the recess 42.

The gaskets 28 and 46 interposed between the piston 26 and the body 12 of the actuator are preferably square gaskets. These gaskets ensure the retraction of the piston 26 when the brake pressure is relaxed.

A bore 48, in which a plunger piston 50 is received slideably, passes through the cylindrical part 12c of the actuator body along the axis common to this part 12c and to the piston 26. The end of this plunger piston opposite the brake block 22 projects out of the bore 48 and enters the recess 32 made in the part 12b of the actuator body, via a hole made in this part opposite the bore 48. A compression spring 52, the ends of which bear respectively on the shoulder formed on the part 12c of the actuator body and on a shoulder formed on the abovementioned end of the plunger piston 50, keeps this end permanently up against a ring 54 which is carried by the central part of the crankshaft 38 and which is offset relative to the axis of the output shaft 36 of the electric motor 34. The ring 54 is mounted on the central part of the crankshaft 38 by means of needle bearings 56 allowing the ring to be prevented from rotating when the crankshaft is driven in rotation by means of the electric motor. This characteristic makes it possible to ensure frictionless contact between the plunger piston 50 and the ring 54.

To avoid problems of wear, the plunger piston 50 operates without packing. Brake fluid thus flows into the chamber which receives the central part of the crankshaft and the ring 54.

The bore 48, in its part nearest to the chamber 44, widens to form a shoulder facing the chamber 44. A flap 58 is laid against this shoulder by means of a compression spring 60 bearing on a rim formed at the end of the bore 48 opening into the main control chamber 44. The part of the bore 48 located between the flap 58 and the end of the plunger piston 50 nearest to this flap forms a pumping chamber 62 of variable volume. More specifically, the volume of the pumping chamber 62 increases and decreases cyclically under the effect of the to-and-fro movement of the plunger piston 50 (the arrow F in FIG. 1) generated as a result of the rotation of the crankshaft 38 controlled by means of the electric motor 34. The assembly comprising the crankshaft 38, plunger piston 50 and chamber 62 thus constitutes a pump.

As illustrated in FIG. 2, the part 12b of the actuator body also serves for accommodating a brake-fluid reservoir 64. This reservoir 64 is formed inside a cylindrical recess 66 of an axis perpendicular to the axis of the shaft 36 of the electric motor 34 and at right angles to the axis of the disc 20. This recess 66 is closed off towards the outside by means of a deformable sealing diaphragm 68 fastened to the part 12b of the actuator body by means of a cup-shaped cover 70. In the cover 70 there is at least one hole 72, via which the outer face of the diaphragm 68 is subjected to atmospheric pressure.

The brake-fluid reservoir 64 communicates with the pumping chamber 62 via an intake duct 74 made in the parts 12b and 12c of the actuator body. This intake duct 74 has, in the part 12c, a zone of larger diameter, in which is accommodated a flap 76 laid against a shoulder, formed at the end of this zone of larger diameter furthest away from the brake block 22, by means of a spring 78 bearing on the opposite end of this zone of the duct 74.

The assembly comprising the flap 76 and the spring 78 forms an intake valve allowing the brake fluid to circulate from the reservoir 64 towards the pumping chamber 62, while at the same time preventing it from circulating in the opposite direction.

Likewise, the assembly consisting of the flap 58 and of the spring 60 forms a delivery valve allowing the brake fluid to circulate from the pumping chamber 62 towards the main control chamber 44, while at the same time preventing it from circulating in the opposite direction. The part of the bore 48 containing this delivery valve is thus a delivery duct, via which the chambers 62 and 44 communicate with one another.

The brake liquid is returned from the main control chamber to the reservoir 64 via a recycling duct which passes through the parts 12b and 12c of the actuator body and only a portion of which is visible at 80 in FIG. 1.

There is therefore, inside the body 12 of the actuator, a closed hydraulic circuit which is filled with brake fluid and which comprises the reservoir 64, the intake duct 74 controlled by means of the intake valve (flap 76 and spring 78), the pumping chamber 62, the delivery duct controlled by means of the delivery valve (flap 58 and spring 60), the main control chamber 44 and the recycling duct 80.

In the embodiment illustrated in FIG. 1, the return of the brake fluid from the chamber 44 to the reservoir 64 via the recycling duct 80 is controlled by means of a solenoid valve 82 mounted in the cylindrical part 12c of the actuator body in an axis parallel to the axis common to the plunger piston 50 and to the brake piston 26. This solenoid valve 82 comprises a winding 84 and a core controlling a pushrod 86 with a hemispherical end 90 so that the latter executes a movement parallel to the axis. Part of the recycling duct passes round the core of the solenoid valve.

When the solenoid valve 82 is not excited, a spring 88 keeps the hemispherical end 90 of the rod 86 away from its seat. Under these conditions, it is possible for the brake fluid to circulate from the chamber 44 towards the reservoir 64.

On the contrary, when the winding 84 of the solenoid valve 82 is excited, the hemispherical end 90 of the rod 86 comes up against its seat, formed in the recycling duct 80, counter to the spring 88. Circulation between the main control chamber 44 and the reservoir 64 is then prevented in both directions.

As shown more clearly in FIG. 2, a second control chamber 92 isolated sealingly from the main control chamber 44 is formed between the piston 26 and the body 12 of the actuator. This control chamber 92 is an annular chamber delimited between the cylinder 12a, the cylidrical part 12c and the tubular part of the piston 26 surrounding this cylindrical part 12c.

A passage 94 made in the part 12b of the actuator body makes it possible to connect this second control chamber 92 to a hydraulic brake circuit of conventional design, independent of the circuit controlling the operation of the electric motor 34. As shown diagrammatically in FIG. 2, this hydraulic circuit comprises, in a known way, a master cylinder 96 which is controlled by means of the brake pedal 98 and which actuates the electric motor at the start of the pedal travel.

Under normal operating conditions, this hydraulic circuit is put at the pressure of a low-pressure reservoir.

FIG. 2 also shows diagrammatically a pressure gauge 100 mounted in the cylindrical part 12c of the actuator body, so that it can measure the pressure prevailing in the main control chamber 44 of this actuator. Electrical conductors 102 partially accommodated in the body 12 of the actuator make it possible to transmit the signals supplied by the pressure gauge 100 to an external circuit 101 which compares the measured pressure value with a theoretical value set according to the position of the brake pedal 98, this also being measured via circuit 103. Thus, by assigning a brake pressure in the main control chamber 44 to each position of the brake pedal 98, the braking intensity can be regulated in a way which will now be described.

When the driver actuates the brake pedal 98, the electrical circuit 101 simultaneously triggers a supply of electricity via conductor 104 to the direct-current motor 34 and via conductor 105 for the excitation of the winding of the solenoid valve 82.

The electric motor 34, being live, drives a crankshaft 38 in rotation at a constant speed, thus resulting in a to-and-fro movement of the plunger piston 50 in the bore 48. By way of the chamber 62 and the intake and delivery valves formed by the flaps 76 and 58 and by their restoring springs, an effect of pumping the brake fluid from the reservoir 64 into the main control chamber 44 is obtained.

The solenoid valve 82, since it is excited, then closes the recycling duct 80 connecting the chamber 44 and the reservoir 64. The pressure in the control chamber 44 then rises progressively, the effect of this being to move the piston 26 in the body 12 of the actuator, until the brake block 22 comes into contact with a corresponding face of the disc 20. In reaction, the caliper 14 slides on the columns 18, and the brake block 24 in turn comes in contact with the opposite face of the disc 20. A braking effect is obtained in this way. This effect is all the greater because there is a high pressure in the chamber 44.

As an illustration which is in no way limiting, effective braking can be obtained in 0.2 seconds by the use of an electric motor rotating at approximately 3,000 revolutions per minute and a unit pumping volume, determined by the stroke of the plunger piston 50 in the bore 48, of approximately 240 mm$^3$.

When the pressure in the chamber 44 reaches the value corresponding to the position of the brake pedal 98, the supply of electricity to the electric motor 34 ceases. The solenoid valve 82 remains excited as long as the brake pedal 98 remains in this position, in order to maintain the pressure in the chamber 44.

When the driver releases the brake pedal 98, the solenoid valve 82 ceases to be excited, so that the brake fluid contained in the chamber 44 returns to the reservoir 64. The braking action is then interrupted.

Such an actuator can advantageously be used on a vehicle also equipped with means for detecting possible slipping of one or more of the vehicle wheels on the ground. In this case, the solenoid valve 82 of the actuator can advantageously be used to control braking both during the pressure rise in the chamber 44 and during the pressure drop in this chamber, in response to signals supplied by an electronic circuit associated with the abovementioned detection means. If the solenoid valve is operated at different frequencies, the gradient of the pressure variation in the chamber 44 is thus regulated as desired, whatever the position of the brake pedal 98.

The means for detecting the slipping of the wheels (speed sensors) and the associated electronic circuit are not part of the present invention and can be formed by any known means making it possible to perform the corresponding functions. They will not be described here.

In the event of failure of the electrical supply circuit of the motor 34, the pressure generated in the master cylinder during the actuation of the brake pedal 98 is injected directly into the chamber 92 and ensures that the brake is actuated.

The hydraulic circuit comprising the master cylinder 96 can also ensure braking when the vehicle is parked. A handbrake lever (not shown) then acts on the master cylinder in the same way as the pedal 98.

Of course, the embodiment of the invention which has just been described can have various alternative forms, without departing from the scope of the invention. Thus, purely as an example, it will be seen that the to-and-fro movement of the plunger piston 50 can be controlled by means of a crank/connecting-rod system driven by the output shaft of the electric motor.

I claim:

1. An electrically controlled hydraulic disc brake actuator controlled by a brake pedal, said actuator comprising:

a body having a longitudinal axis parallel to a rotational axis of the disc;

a brake piston designed to slide parallel to said axis of said body and delimiting a main control chamber together with the body, a cylindrical recess disposed in the brake piston and into which a cylindrical part of said body projects;

an electric motor connected with said body and having an output shaft with a rotational axis perpendicular to said axis of said body;

a brake fluid reservoir formed in said body;

a pressure gauge located in said control chamber for providing signals corresponding to the pressure within said control chamber, said signals being transmitted to an external circuit for comparing a measured pressure value with a theoretical value set according to the position of the brake pedal;

a pump located within said body and driven by said output shaft of said electric motor, having:

one plunger piston, a longitudinal axis of which is parallel to said axis of said body, an intake duct accommodating an intake valve and communicating with said reservoir, a delivery duct accommodating a delivery valve and communicating with said main control chamber, and a variable volume pumping chamber partially delimited by one end of said plunger piston the other end of which is connected with said output shaft by means of a crankshaft carried by said output shaft and converting a rotation of said output shaft into reciprocating movement of said plunger piston parallel to said axis of said body, and a recycling duct in the body controlled by means of a solenoid valve accommodated in said body and operating to selectively connect said control chamber and reservoir.

2. The actuator according to claim 1, wherein a second control chamber separated from said main control chamber by sealing means is formed between a tubular part of said brake piston surrounding said recess and a cylinder which belongs to the body and in which said tubular part of said brake piston slides, the second control chamber extending longitudinally so that part of the second control chamber is disposed radially outwardly of the tubular part.

3. An electrically controlled hydraulic disc brake actuator controlled by a brake pedal, said actuator comprising:

a body having a longitudinal axis parallel to a rotational axis of the disc;

a brake piston designed to slide parallel to said axis of said body and delimiting a main control chamber together with the body, a cylindrical recess disposed in the brake piston and into which a cylindrical part of said body projects;

an electric motor connected with said body and having an output shaft with a rotational axis perpendicular to said axis of said body;

a brake fluid reservoir formed in said body;

a pressure gauge located in said control chamber for providing signals corresponding to the pressure within said control chamber, said signals being transmitted to an external circuit for comparing a measured pressure value with a theoretical value set according to the position of the brake pedal;

a pump located within said body and driven by said output shaft of said electric motor, having:

one plunger piston, a longitudinal axis of which is parallel to said axis of said body, an intake duct accommodating an intake valve and communicating with said reservoir, a delivery duct accommodating a delivery valve and communicating with said main control chamber, and a variable volume pumping chamber partially delimited by one end of said plunger piston the other end of which is connected with said output shaft by means of a crankshaft carried by said output shaft and converting a rotation of said output shaft into reciprocating movement of said plunger piston parallel to said axis of said body, a recycling duct in the body controlled by means of a solenoid valve accommodated in said body and operating to selectively connect said control chamber and reservoir, and a second control chamber separated from said main control chamber by sealing means formed between a tubular part of said brake piston surrounding said recess and a cylinder which belongs to the body and in which said tubular part of said brake piston slides.

* * * * *